(12) United States Patent
Gong et al.

(10) Patent No.: US 10,880,419 B2
(45) Date of Patent: Dec. 29, 2020

(54) MOBILE TERMINAL AND ELECTRONIC APPARATUS

(71) Applicant: Guangdong OPPO Mobile Telecommunications Corp., Ltd., Guangdong (CN)

(72) Inventors: Guan Gong, Guangdong (CN); Xiaoyu Fan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/563,446

(22) Filed: Sep. 6, 2019

(65) Prior Publication Data

US 2020/0084307 A1 Mar. 12, 2020

(30) Foreign Application Priority Data

Sep. 7, 2018 (CN) .................... 2018 2 1472071 U

(51) Int. Cl.
*H04M 1/02* (2006.01)

(52) U.S. Cl.
CPC ....... *H04M 1/0264* (2013.01); *H04M 1/0208* (2013.01); *H04M 2250/20* (2013.01)

(58) Field of Classification Search
CPC ............. H04M 1/0264; H04M 1/0208; H04M 2250/20; H04N 5/2257; H04N 5/2251
See application file for complete search history.

(56) References Cited

U.S. PATENT DOCUMENTS

| | | | |
|---|---|---|---|
| 7,435,018 B2* | 10/2008 | Huang | ................... G03B 17/04 348/373 |
| 9,467,540 B2 | 10/2016 | Feng | |
| 10,142,525 B2* | 11/2018 | Tachikawa | ........... H04N 5/2253 |
| 10,444,802 B2* | 10/2019 | Zeng | ................... H04M 1/0237 |
| 10,571,959 B2* | 2/2020 | Liao | ....................... G06F 1/1605 |
| 10,623,539 B2* | 4/2020 | Cheng | ................. H04M 1/0233 |
| 10,659,667 B1* | 5/2020 | Qiu | ......................... G03B 29/00 |
| 2005/0157195 A1* | 7/2005 | Ohashi | ................ H04M 1/0214 348/333.06 |

(Continued)

FOREIGN PATENT DOCUMENTS

| | | |
|---|---|---|
| CN | 106790833 A | 5/2017 |
| CN | 106817450 A | 6/2017 |

(Continued)

OTHER PUBLICATIONS

International search report,PCT/CN2019/104741, dated Nov. 27, 2019 (4 pages).

(Continued)

*Primary Examiner* — Timothy J Henn

(57) ABSTRACT

An electronic apparatus may include a main body defining a chamber, a rotating member received in the chamber and rotatably connected to the main body and a sliding mechanism including a sliding rail and a sliding member matching with the sliding rail. The sliding rail may be arranged on one of the main body and the rotating member, the sliding member may be arranged on the other one of the main body and the rotating member. The sliding member may be capable of sliding in the sliding rail, such that the rotating member rotates out and into the chamber.

19 Claims, 6 Drawing Sheets

(56) References Cited

U.S. PATENT DOCUMENTS

| | | | | |
|---|---|---|---|---|
| 2007/0253703 A1* | 11/2007 | Tsai | ................ | G06F 1/1686 |
| | | | | 396/429 |
| 2007/0267108 A1* | 11/2007 | Ogura | ................ | C22C 19/03 |
| | | | | 148/402 |
| 2014/0232865 A1* | 8/2014 | Kim | ................ | H04N 5/2257 |
| | | | | 348/143 |
| 2015/0288880 A1* | 10/2015 | Chen | ................ | H04N 5/2259 |
| | | | | 348/36 |
| 2018/0292866 A1* | 10/2018 | Tucker | ................ | G06F 1/1686 |
| 2019/0033926 A1* | 1/2019 | Huang | ................ | H04M 1/0264 |
| 2019/0173986 A1* | 6/2019 | Xu | ................ | H04M 1/0208 |
| 2019/0215389 A1* | 7/2019 | Yin | ................ | H04M 1/0264 |
| 2019/0253542 A1* | 8/2019 | Fan | ................ | H04M 1/0237 |
| 2019/0302842 A1* | 10/2019 | Sun | ................ | G06F 1/1683 |
| 2019/0342435 A1* | 11/2019 | Chen | ................ | G06F 1/1686 |
| 2020/0154010 A1* | 5/2020 | Shi | ................ | H04N 5/2253 |

FOREIGN PATENT DOCUMENTS

| | | | |
|---|---|---|---|
| CN | 107295129 | A | 10/2017 |
| CN | 107911579 | A | 4/2018 |
| CN | 207491006 | U | 6/2018 |
| CN | 207603716 | U | 7/2018 |
| CN | 209105221 | U | 7/2019 |
| EP | 1727356 | A2 | 11/2006 |

OTHER PUBLICATIONS

European search report, EP19195703, dated Oct. 29, 2019 (8 pages).

\* cited by examiner

MOBILE TERMINAL AND ELECTRONIC APPARATUS

CROSS-REFERENCE TO RELATED APPLICATION(S)

This application claims priority to Chinese Patent Application No. 201821472071.1, filed on Sep. 7, 2018, the contents of which are herein incorporated by reference in their entireties.

TECHNICAL FIELD

The described embodiments relate to a mobile terminal technology, and in particular to a mobile terminal with a rotatable camera assembly.

BACKGROUND

In order to improve the screen ratio of a mobile terminal, a general solution is to provide a camera that could be rotated to expose from a top of the mobile terminal. A large rotation gap is needed for the camera to rotate, so as to avoid interference between the camera and other mechanisms. The large rotation gap has an adverse effect on the overall appearance of the mobile terminal.

SUMMARY

According to an aspect of the present disclosure, a mobile terminal may include a terminal device and a mounting base. The terminal device may include a housing, a screen and a restriction post. The housing may include a front face, a rear face arranged opposite to the front face, and a side-circumferential face connected between the front face and the rear face. The side-circumferential face may include a left-side face, a right-side face arranged opposite to the left-side face, a top-side face and a bottom-side face arranged opposite to the top side face. The left-side face and the right-side face may be arranged between the top-side face and the bottom-side face. The top-side face and the bottom-side face may be arranged between the left-side face and the right-side face. The screen may be embedded in the housing and defining a mounting groove with the housing. The mounting groove may penetrate the top-side face, the screen may include a display area facing a same direction as the front face. The restriction post may be arranged on an inner wall of the mounting groove. The mounting base may include a shell and a first camera module. The shell may include a front-end face, a rear-end face arranged opposite to the front-end face, and a side-end face connected between the front-end face and the rear-end face. The side-end face may include a left-end face, a right-end face arranged opposite to the left-end face, a top-end face, a bottom-end face arranged opposite to the top-end face. The left-end face and the right end face may be arranged between the top-end face and the bottom-end face; the top-end face and the bottom-end face may be arranged between the left-end face and the right end face; the front-end face may be arranged towards the front face. An arc-shaped groove penetrating at least one of the front-end face and the rear-end face may be defined in the shell, the arc-shaped groove may be defined between the top-end face and the bottom-end face, and between the left-end face and the right-end face. The first camera module may be arranged on the shell and comprising a first light incident face being exposed from the front-end face. The restriction post may be inserted into the arc-shaped groove.

The mounting base may be configured to rotate, through a sliding fit between the arc-shaped groove and the restriction post, to a first position at which the first camera module is in the mounting groove and the first light incident face is hidden in the terminal device, and a second position at which the first camera module is out of the mounting groove and the first light incident face is exposed from the front face.

According to another aspect of the present disclosure, an electronic apparatus may include a main body defining a chamber, a rotating member received in the chamber and rotatably connected to the main body and a sliding mechanism including a sliding rail and a sliding member matching with the sliding rail. The sliding rail may be arranged on one of the main body and the rotating member, the sliding member may be arranged on the other one of the main body and the rotating member. The sliding member may be capable of sliding in the sliding rail, such that the rotating member rotates out and into the chamber.

According to another aspect of the present disclosure, an electronic apparatus may include a main body and a mounting base. The main body may include a housing, a screen and a restriction post. The screen may be embedded in the housing and define a mounting groove with the housing. The restriction post may be arranged on the housing. The mounting base may be received in the mounting groove and defining an arc-shaped groove. The restriction post may be inserted into the arc-shaped groove. The mounting base may be configured to rotate, through a sliding fit between the arc-shaped groove and the restriction post, to a first position at which the mounting base is in the mounting groove and a second position at which the mounting base is out of the mounting groove. A rotation axis of the mounting base may be tangent to an outer surface of the mounting base, and the rotation axis may pass through a center of an arc of the arc-shaped groove.

BRIEF DESCRIPTION OF DRAWINGS

In order to clearly illustrate the technical solutions of the present disclosure, the drawings used in the description of the embodiments will be briefly described. It is understood that the drawings described herein are merely some embodiments of the present disclosure. Those skilled in the art may derive other drawings from these drawings without inventive effort.

DETAILED DESCRIPTION

Figure 1:
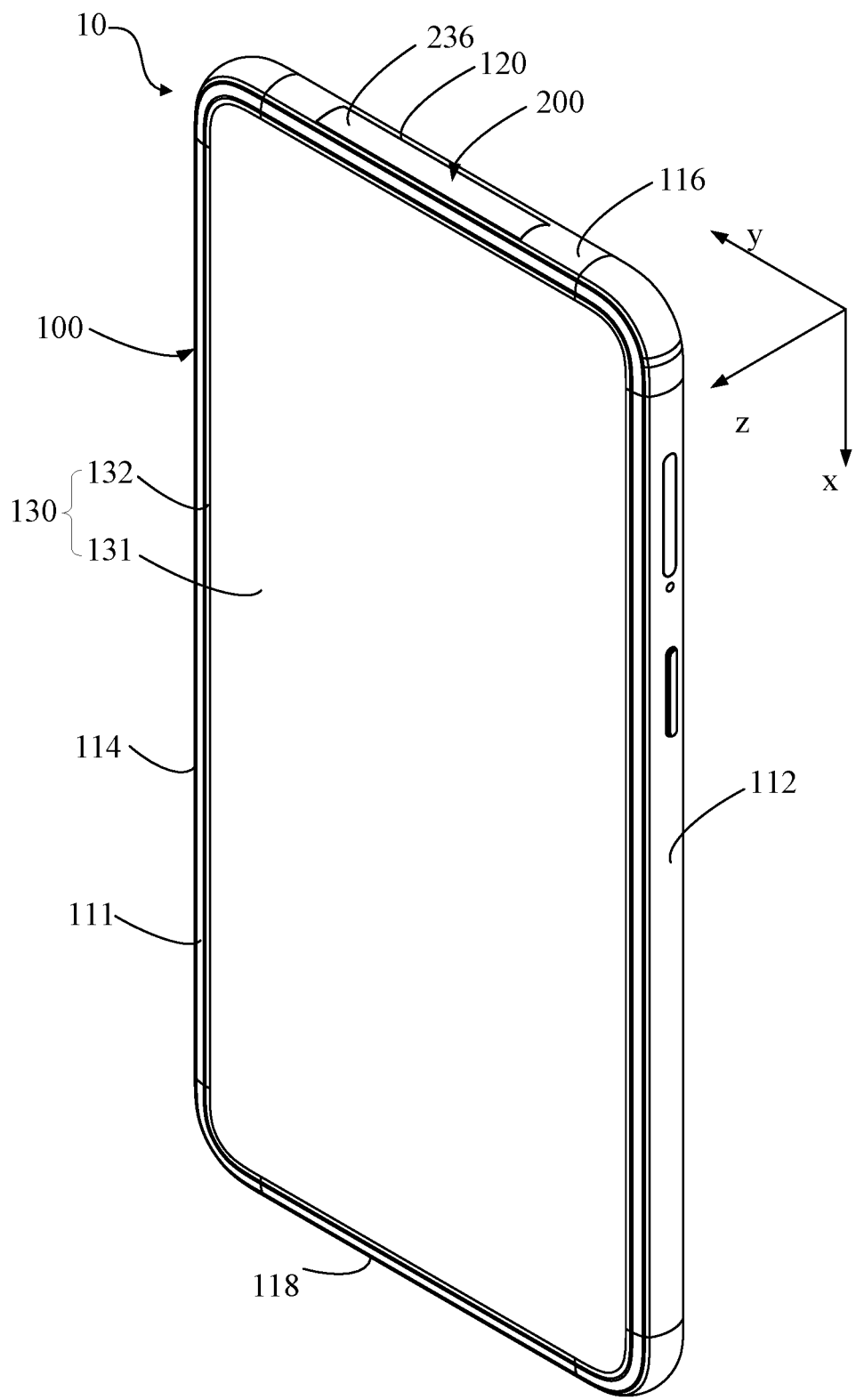
FIG. 1 is an isometric view of a mounting base of a mobile terminal in a first position and viewed from an aspect in accordance with an embodiment of the present disclosure.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the understanding of the present disclosure will be more thorough.

A "terminal device" as used herein may refer to a device configured to receive and/or transmit a communication signal by including, but being not limited to any one or more of the following connection methods.

(1) A connection method by a wired line, such as a public switched telephone network (PSTN), a digital subscriber line (DSL), a digital cable, and a direct cable connection.

(2) A connection method by a wireless interface, such as a cellular network, a wireless local area network (WLAN), a digital television network such as a DVB-H network, a satellite network, and an AM-FM broadcast transmitter.

A terminal device configured to receive and/or transmit a communication signal by a wireless interface, may be referred as a "mobile terminal". The mobile terminal may include, but may be not limited to the following electronic apparatuses.

(1) A satellite or cellular telephone.

(2) A terminal of personal communications system (PCS) that may combine cellular telephone with data processing, fax, and data communication capabilities.

(3) A radiotelephone, a pager, an internet/intranet access, a web browser, a notepad, a calendar, and a personal digital assistant (PDA) equipped with a global positioning system (GPS) receiver.

(4) A conventional laptop and/or a palm receiver.

(5) A conventional laptop and/or a palm-type radiotelephone transceiver and the like.

According to an aspect of the present disclosure, a mobile terminal may include a terminal device and a mounting base. The terminal device may include a front face, a rear face arranged opposite to the front face, and a side-circumferential face connected between the front face and the rear face; wherein the side-circumferential face may include a left-side face, a right-side face arranged opposite to the left-side face, a top-side face and a bottom-side face arranged opposite to the top side face; the left-side face and the right-side face may be arranged between the top-side face and the bottom-side face; the top-side face and the bottom-side face may be arranged between the left-side face and the right-side face; a screen including a display area arranged towards the front face, the display area is in a side of the screen away from the mounting groove and a restriction post, arranged in the mounting groove. A mounting groove penetrating the top-side face may be defined in the terminal device. The mounting base may include a front-end face, a rear-end face arranged opposite to the front-end face, and a side-end face connected between the front-end face and the rear-end face; and a first camera module including a first light incident face being exposed from the front-end face. The side-end face may include a left-end face, a right-end face arranged opposite to the left-end face, a top-end face, a bottom-end face arranged opposite to the top-end face; the left-end face and the right end face may be arranged between the top-end face and the bottom-end face; the top-end face and the bottom-end face may be arranged between the left-end face and the right end face; the front-end face may be arranged towards the front face. An arc-shaped groove penetrating at least one of the front-end face and the rear-end face may be defined in the mounting base, the arc-shaped groove may be defined between the top-end face and the bottom-end face, and between the left-end face and the right-end face. The restriction post may be inserted into the arc-shaped groove. The mounting base may be configured to rotate in the mounting groove, through a sliding fit between the arc-shaped groove and the restriction post, to a first position at which the first light incident face is hidden in the terminal device and a second position at which the first light incident face is exposed from the front face.

According to another aspect of the present disclosure, a mobile terminal may include a terminal device and a mounting base. The terminal device may include a housing, a screen and a restriction post. The housing may include a front face, a rear face arranged opposite to the front face, and a side-circumferential face connected between the front face and the rear face. The side-circumferential face may include a left-side face, a right-side face arranged opposite to the left-side face, a top-side face and a bottom-side face arranged opposite to the top side face. The left-side face and the right-side face may be arranged between the top-side face and the bottom-side face. The top-side face and the bottom-side face may be arranged between the left-side face and the right-side face. The screen may be embedded in the housing and defining a mounting groove with the housing. The mounting groove may penetrate the top-side face, the screen may include a display area facing a same direction as the front face. The restriction post may be arranged on an inner wall of the mounting groove. The mounting base may include a shell and a first camera module. The shell may include a front-end face, a rear-end face arranged opposite to the front-end face, and a side-end face connected between the front-end face and the rear-end face. The side-end face may include a left-end face, a right-end face arranged opposite to the left-end face, a top-end face, a bottom-end face arranged opposite to the top-end face. The left-end face and the right end face may be arranged between the top-end face and the bottom-end face; the top-end face and the bottom-end face may be arranged between the left-end face and the right end face; the front-end face may be arranged towards the front face. An arc-shaped groove penetrating at least one of the front-end face and the rear-end face may be defined in the shell, the arc-shaped groove may be defined between the top-end face and the bottom-end face, and between the left-end face and the right-end face. The first camera module may be arranged on the shell and comprising a first light incident face being exposed from the front-end face. The restriction post may be inserted into the arc-shaped groove. The mounting base may be configured to rotate, through a sliding fit between the arc-shaped groove and the restriction post, to a first position at which the first camera module is in the mounting groove and the first light incident face is hidden in the terminal device, and a second position at which the first camera module is out of the mounting groove and the first light incident face is exposed from the front face.

In some embodiments, the mobile terminal may further include a power member connected to the terminal device and a push rod. The power member may be configured to drive the push rod to move along a length direction of the terminal device, to drive the mounting base to rotate from the first position to the second position.

In some embodiments, the mobile terminal may further include a power member connected to the terminal device and a push rod. An end of the push rod may be connected to the power member, the other end of the push rod may be slidably connected to the mounting base. The power member may be configured to drive the push rod to move along a direction from the bottom-side face to the top-side face, to drive the mounting base to rotate from the first position to the second position.

In some embodiments, the mobile terminal may further include a first gear connected to the power member, a second gear engaged with the first gear, a lead screw connected to the second gear and defining a spiral groove; and a scroll member rotatably connected to the push rod, and rollably disposed in the spiral groove. The push rod may be slidably connected to the mounting base, the power member may be configured to drive the first gear to rotate, and the first gear may be configured to drive the lead screw to rotate through the second gear, the lead screw may be configured to drive the push rod to move along the length direction of the terminal device.

In some embodiments, the mobile terminal may further include a first gear connected to the power member, a second gear engaged with the first gear, a lead screw connected to the second gear and defining a spiral groove; and a scroll member rotatably connected to the push rod, and rollably disposed in the spiral groove. The power member may be configured to drive the first gear to rotate, and the first gear may be configured to drive the lead screw to rotate through the second gear, the lead screw may be configured to drive the push rod to move along the direction from the bottom-side face to the top-side face.

In some embodiments, the top-end face may be flush with the top-side face when the mounting base is at the first position; and the top-end face may be offset from the top-side face when the mounting base is at the second position.

In some embodiments, an orthogonal projection of the left-end face on a reference plane may have an arc shape, and a rotation axis of the mounting base may pass through a center of the arc shape of the orthogonal projection of the left-end face. The reference plane is a geometric plane perpendicular to a thickness direction of the terminal device.

In some embodiments, an orthogonal projection of the left-end face on a reference plane may have an arc shape, and a rotation axis of the mounting base may pass through a center of the arc shape of the orthogonal projection of the left-end face. The reference plane is a geometric plane perpendicular to a direction from the front face to the rear face.

In some embodiments, the mounting base may be a rectangular block, an intersection line of the top-end face and the right-end face may form a first side edge; an intersection line of the top-end face and the left-end face may form a second side edge; the first side edge and the second side edge may be exposed from the top-side face; the first side edge may pass through a center of an orthographic projection of a wall of the arc-shaped groove on a reference plane. The reference plane may be a geometric plane perpendicular to a thickness direction of the terminal device.

In some embodiments, an intersection line of the top-end face and the right-end face may form a first side edge; an intersection line of the top-end face and the left-end face may form a second side edge; the first side edge and the second side edge may be exposed from the top-side face; the first side edge may pass through a center of an orthographic projection of a wall of the arc-shaped groove on a reference plane. The reference plane may be a geometric plane perpendicular to a thickness direction of the terminal device.

In some embodiments, a wall of the arc-shaped groove may include a first limiting position and a second limiting position. When the mounting base is at the first position, the restriction post may abut against the first limiting position; and when the mounting base is at the second position, the restriction post may abut against the second limiting position.

In some embodiments, a wall of the arc-shaped groove may include a first limiting portion and a second limiting portion. When the mounting base is at the first position, the restriction post may abut against the first limiting portion; and when the mounting base is at the second position, the restriction post may abut against the second limiting portion.

In some embodiments, the first camera module may include an image sensor, an orthogonal projection of the image sensor on a reference plane has a shape of rectangle. When the mounting base is at the second position, an orthographic projection of the image sensor on the reference plane may have a side closer to the top-side face, and the side is parallel to a width direction of the terminal device; and the reference plane may be a geometric plane perpendicular to a thickness direction of the terminal device.

In some embodiments, the first camera module may include an image sensor, an orthogonal projection of the image sensor on a reference plane has a shape of rectangle. When the mounting base is at the second position, an orthographic projection of the image sensor on the reference plane may have a side closer to the top-side face, and the side is parallel to a direction from the left-side face to the right-side face; and the reference plane may be a geometric plane perpendicular to a direction from the front face to the rear face.

In some embodiments, the mobile terminal may further include a second camera module having a second light incident face. The second camera module may be arranged on the terminal device, the second light incident surface may be exposed from the rear face.

In some embodiments, the mounting base may include a receiver and a flash lamp, when the mounting base is at the first position, the flash lamp may be hidden in the terminal device; and when the mounting base is at the second position, the flash lamp may be exposed from the front face.

In some embodiments, the mounting base may include a receiver and a flash lamp, when the mounting base is at the first position, the flash lamp and the receiver may be hidden in the terminal device; and when the mounting base is at the second position, the flash lamp and the receiver may be exposed from the front face.

In some embodiments, the mobile terminal may further include an elastic return member, wherein an end of the elastic return member may be connected to the mounting base, the other end of the elastic return member may be connected to the terminal device; the elastic return members may be configured to drive the mounting base to rotate from the second position to the first position.

In some embodiments, the mounting groove may be defined between the left-side face and the right-side face, and between the front face and the rear face.

In some embodiments, the mounting groove may be defined between the left-side face and the right-side face, and between the front face and the rear face.

According to another aspect of the present disclosure, a mobile terminal may include a front face, a rear face arranged opposite to the front face, and a side-circumferential face connected between the front face and the rear face, a screen and a mounting base. The side-circumferential face may include a left-side face, a right-side face arranged opposite to the left-side face, a top-side face and a bottom-side face arranged opposite to the top side face. The left-side face and the right-side face may be arranged between the top-side face and the bottom-side face. The top-side face and the bottom-side face may be arranged between the left-side face and the right-side face. A mounting groove penetrating the top-side face may be defined in the terminal device. The screen may include a display area arranged towards the front face, the display area may be in a side of the screen away from the mounting groove. The mounting base may include a first camera module having a first light incident face being exposed from the front-end face. An arc-shaped groove may be defined in the mounting base. The restriction post may be inserted into the arc-shaped groove. The mounting base may be configured to rotate, through a sliding fit between the arc-shaped groove and the restriction post, to a first position at which the first light face is hidden in the terminal device and a second position at which the first light incident face is exposed from the front face. A rotation axis of the mounting base may be tangent to an outer surface of the mounting base, and the rotation axis may pass through a center of an orthogonal projection of a wall of the arc-shaped groove on a reference plane. The reference plane may be a geometric plane perpendicular to a thickness direction of the terminal device.

According to another aspect of the present disclosure, an electronic apparatus may include a main body defining a chamber, a rotating member received in the chamber and rotatably connected to the main body and a sliding mechanism including a sliding rail and a sliding member matching with the sliding rail. The sliding rail may be arranged on one of the main body and the rotating member, the sliding member may be arranged on the other one of the main body and the rotating member. The sliding member may be capable of sliding in the sliding rail, such that the rotating member rotates out and into the chamber.

In some embodiments, the sliding rail may be a sliding groove defined in the rotating member and having an arc shape; and the sliding member may be a restriction post arranged on an inner wall of the chamber and inserted to the sliding groove.

In some embodiments, the rotating member may include a supporter rotatably connected to the inner wall of the main body and a camera assembly fixed on the supporter. The sliding groove may be defined in the supporter, when the rotating member is at the first position, the first camera assembly may be hidden in the main body; when the rotating member is at the second position, the first camera assembly may be exposed out of the main body.

In some embodiments, a wall of the sliding groove may include a first limiting portion and a second limiting portion opposite to the first limiting portion. When the rotating member is rotated to the first position, the rotating member may be stopped by the first limiting portion, and when the rotating member is rotated to the second position, the rotating member may be stopped the second limiting portion.

In some embodiments, a rotation axis of the rotating member may be tangent to an outer surface of the rotating member, and the rotation axis may pass through a center of an arc of the sliding groove.

In some embodiments, the electronic apparatus may further include a power member connected to the terminal device and a push rod. An end of the push rod may be connected to the power member, the other end of the push rod may be slidably connected to the mounting base. The power member may be configured to drive the push rod to move to drive the mounting base to rotate.

According to another aspect of the present disclosure, an electronic apparatus may include a main body and a mounting base. The main body may include a housing, a screen and a restriction post. The screen may be embedded in the housing and define a mounting groove with the housing. The restriction post may be arranged on the housing. The mounting base may be received in the mounting groove and defining an arc-shaped groove. The restriction post may be inserted into the arc-shaped groove. The mounting base may be configured to rotate, through a sliding fit between the arc-shaped groove and the restriction post, to a first position at which the mounting base is in the mounting groove and a second position at which the mounting base is out of the mounting groove. A rotation axis of the mounting base may be tangent to an outer surface of the mounting base, and the rotation axis may pass through a center of an arc of the arc-shaped groove.

Referring to FIGS. 1 to 4, in an embodiment, a mobile terminal 10 is a smart phone. In some embodiments, the mobile terminal 10 may include a terminal device 100, which may also be called as a main body, and a mounting base 200, which may also be called as a rotating member.

Figure 5:
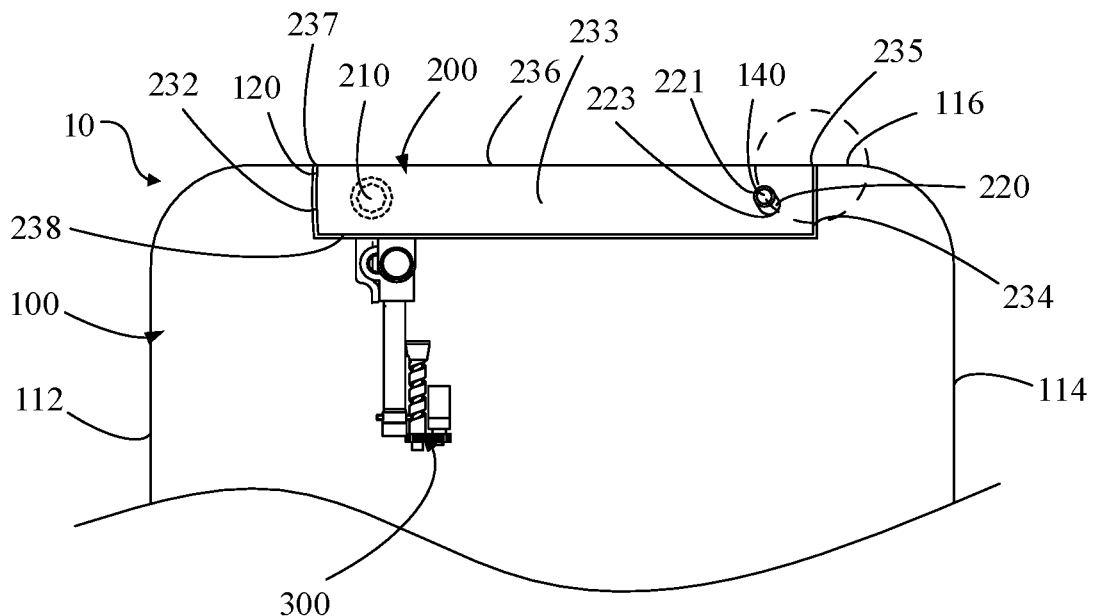
FIG. 5 is a schematic view of the mounting base shown in FIG. 4 in a first position in accordance with an embodiment in the present disclosure.

The terminal device 100 may have a substantially rectangular block shape. The terminal device 100 may include a housing, a screen 130 embedded in the housing and a restriction post 140 arranged in the housing (as shown in FIG. 5).

The housing may include a front face 111, a rear face 113 arranged opposite to the front face 111, and a side-circumferential face connected between the front face 111 and the rear face 113. The side-circumferential face may include a left-side face 112, a right-side face 114 arranged opposite to the left-side face 112, a top-side face 116 and a bottom-side face 118 arranged opposite to the top side face 116. The left-side face 112 and the right-side face 114 may be arranged between the top-side face 116 and the bottom-side face 118. The top-side face 116 and the bottom-side face 118 are arranged between the left-side face 112 and the right-side face 114.

The screen 130 may be configured to display information and provide an interactive interface for a user. Specifically, the screen 130 may include a display area 131 configured to display information and a non-display area 132, the display area may face a same direction as the front face 111.

Figure 4:
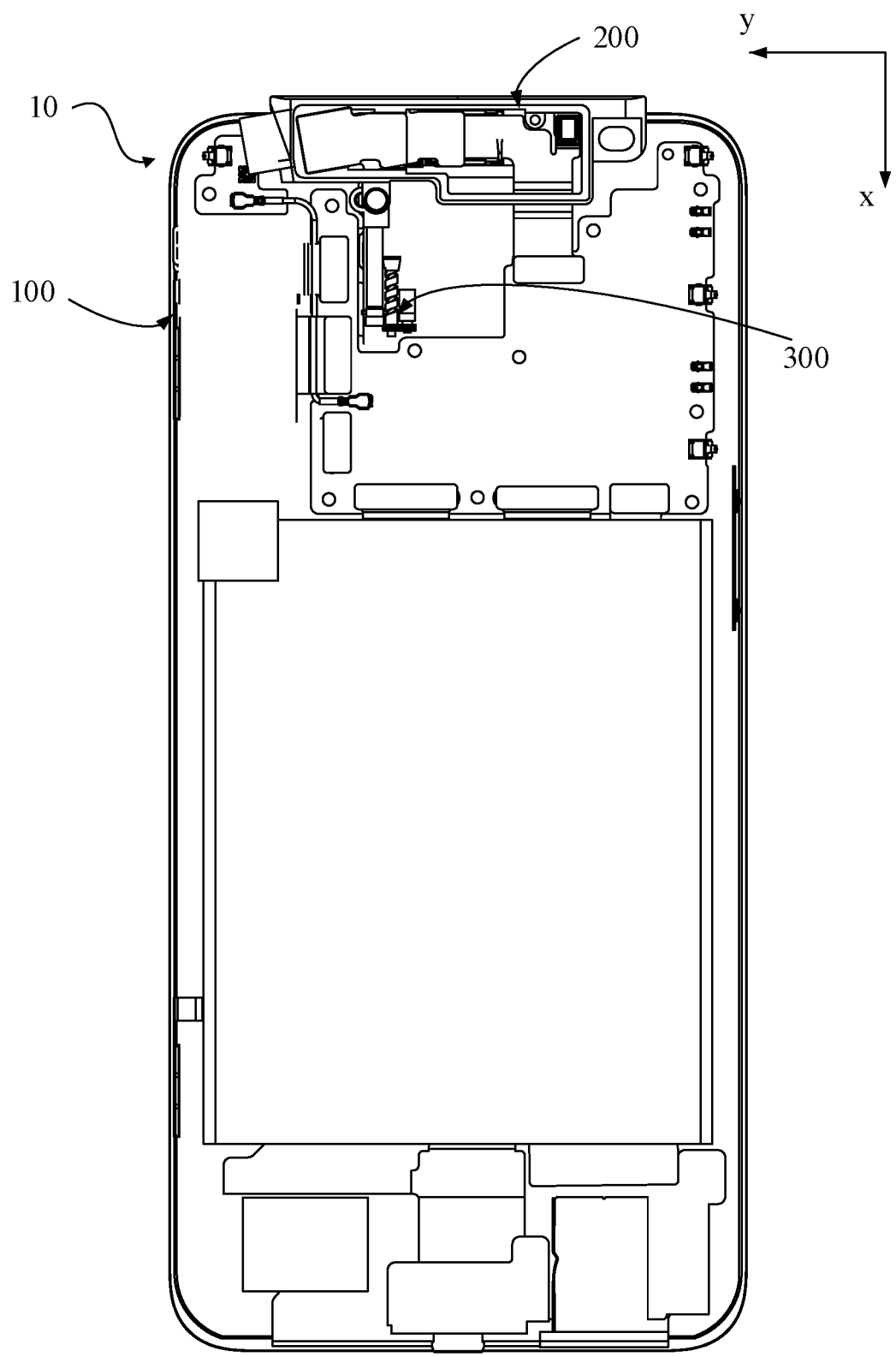
FIG. 4 is a schematic view of positions of a part of components inside the mobile terminal shown in FIG. 1.

The screen 130 may define a mounting groove 120 with the housing. The mounting groove 120 may also be called as a chamber. The mounting groove 120 may penetrate the top-side face 116. Referring to FIG. 4 and FIG. 5, the mounting groove 120 may be located on a side away from the display area 131. In some embodiments, the mounting groove 120 may be defined between the left-side face 112 and the right-side face 114. The mounting groove 120 may be defined between the front face 111 and the rear face 113. In other embodiments, the mounting groove 120 may penetrate the rear face 113.

The restriction post 140, in some embodiments, may also called as a sliding member, may be arranged on an inner wall of the mounting groove 120.

Figure 2:
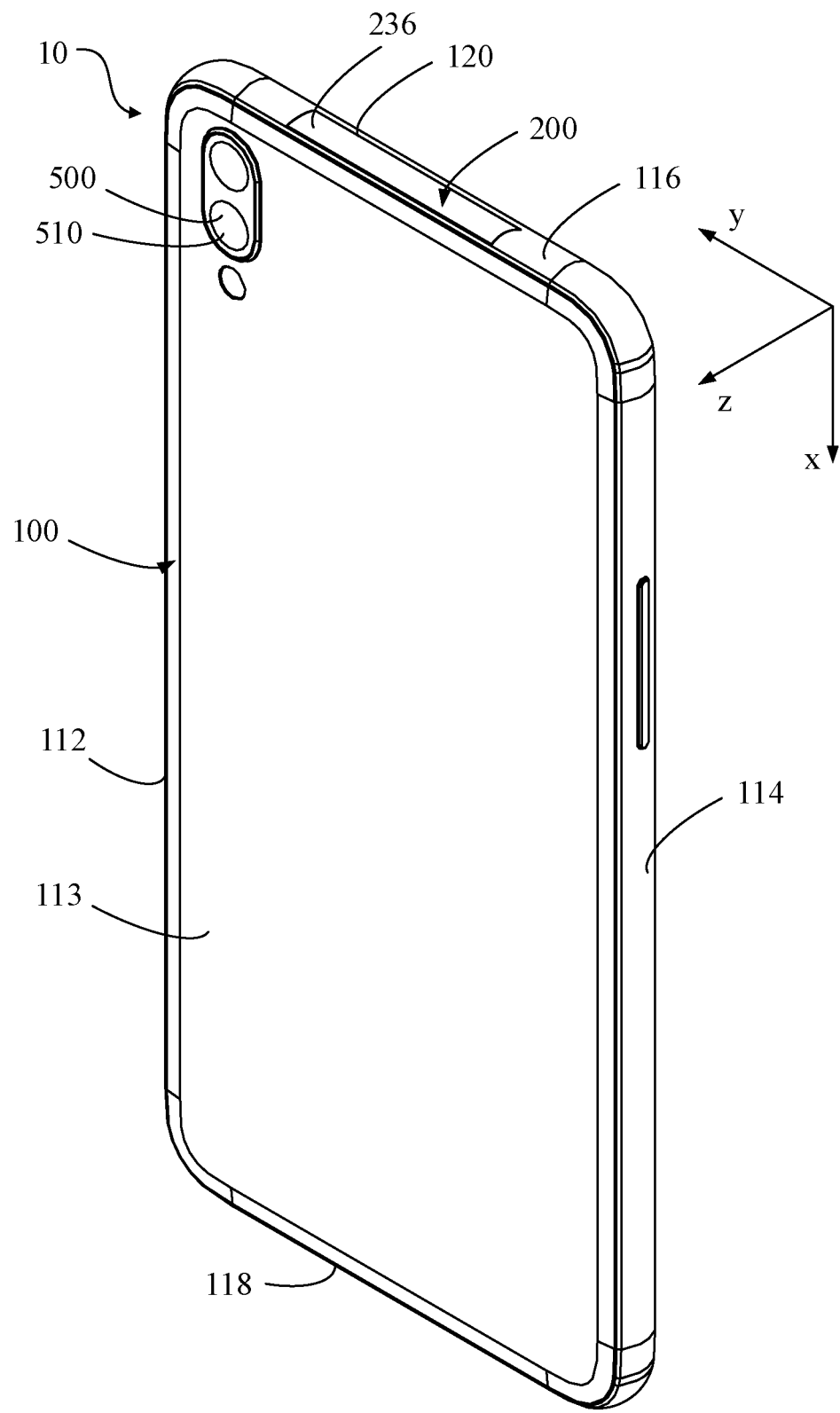
FIG. 2 is an isometric view of the mounting base of the mobile terminal shown in FIG. 1 in a first position and viewed from another aspect.
Figure 3:
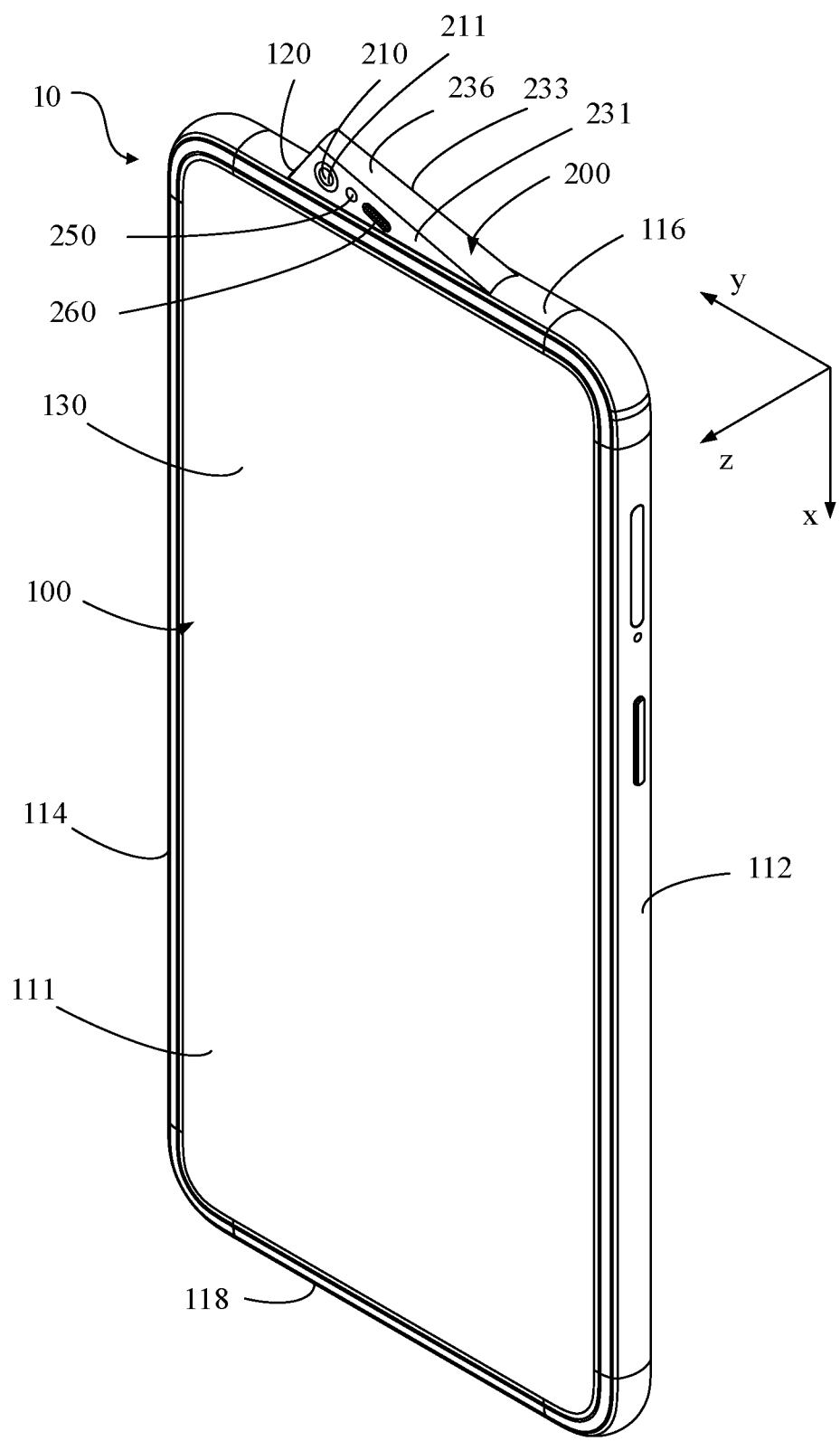
FIG. 3 is an isometric view of the mounting base of the mobile terminal shown in FIG. 1 in a second position.

Referring to FIGS. 1 to 3, the mounting base 200 may be received in the mounting groove 120 and rotatably connected to the terminal device 100. In some embodiments, the mounting base 200 may include a shell, which may also be called as a supporter, and a first camera module 210 arranged on the shell.

Figure 6:
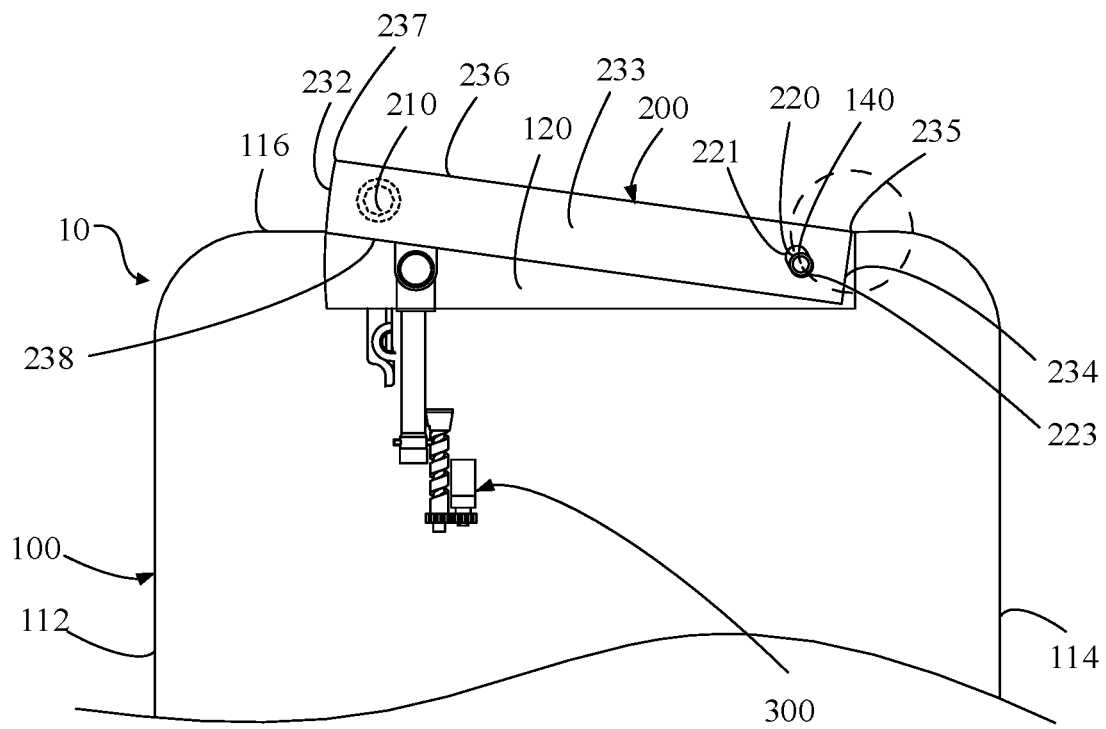
FIG. 6 is a schematic view of the mounting base shown in FIG. 5 in a second position.

Specifically, referring to FIGS. 3, 5, and 6, the shell may be rotatably connected to the inner wall of the terminal device 100, may have a substantially rectangular block shape. The shell may include a front-end face 231, a rear-end face 233 arranged opposite to the front-end face 231, and a side-end face connected between the front-end face 231 and the rear-end face 233. The front-end face 231 may be arranged toward the front face 111, that is, the front-end face 231 may face a same direction as the front face 111. The side-end face may include a left-end face 232, a right-end face 234 arranged opposite to the left-end face 232, a top-end face 236, a bottom-end face 238 arranged opposite to the top-end face 236. The left-end face 232 and the right end face 234 may be arranged between the top-end face 236 and the bottom-end face 238. The top-end face 236 and the bottom-end face 238 may be arranged between the left-end face 232 and the right end face 234.

Referring to FIGS. 4 to 6, a sliding rail may be arranged on the shell, for example, the sliding rail may be a sliding groove. In some embodiments, the sliding rail may be an arc-shaped groove 220 defined in the shell, and further be defined between the top-end face 236 and the bottom-end face 238, and between the left-end face 232 and the right-end face 234. In some embodiments, the arc-shaped groove 220 may penetrate at least one of the front-end face 231 and the rear-end face 233. The arc-shaped groove 220 may be defined between the top-end face 236 and the bottom-end face 238, and between the left-end face 232 and the right-end face 234.

In other embodiments, the restriction post 140 (or the sliding member) and the arc-shaped groove 220 (or the sliding rail) matching with the restriction post 140 (or the sliding member) may be named as a sliding mechanism. In some embodiments, the restriction post 140 (or the sliding member) could be arranged on the mounting base 200, and the arc-shaped groove 220 (or the sliding rail) could be defined on the inner wall of the mounting groove 120.

The first camera module 210, which may also be called as a first camera assembly, may be arranged on the shell or fixed on the shell, and include a first light incident face 211. Ambient light may pass through the first light incident surface 211 and be incident on a photosensitive element of the first camera module 210. In some embodiments, the first light incident face 211 could be exposed from the front-end face 231.

The restriction post 140 may be inserted into the arc-shaped groove 220. The mounting base 200 may be configured to rotate, through a sliding fit between the arc-shaped groove 220 and the restriction post 140, to a first position and a second position. When the mounting base 200 is rotating, the restriction post 140 may slide in the arc-shaped groove 220 relative to the mounting base 200. The relative sliding of the restriction post 140 is guided by a wall of the arc-shaped groove 220.

Referring to FIG. 5, when the mounting base 200 is at the first position, the first camera module 210 is in the mounting groove 120 and the first light incident face 211 is hidden in the terminal device 100. Referring to FIG. 6, when the mounting base 200 is at the second position, the first camera module 210 is out of the mounting groove 120 and the first light incident face 211 is exposed from the front face 111. When the mounting base 200 is at the second position, the first camera module 210 could perform a function of the front camera. For example, a user may perform self-timer, video call, and the like through the first camera module 210. In other embodiments, the mobile terminal 10 may be a tablet or the like.

In some embodiments, when the mounting base 200 is in the first position, the top-end face 236 may be flush with the top-side face 116. When the mounting base 200 is in the second position, the top-end face 236 may be offset from the top-side face 116, that is, the top-end face 236 may be inclined relative to the top-side face 116. In other words, a plane on which top-end face 236 is located intersects with a plane on which the top-side face 116 is located. The mobile terminal 10 including the above-mentioned structure may have high appearance integrity when the mounting base 200 is in the first position.

In some embodiments, when the mounting base 200 is at the first position, at least part of the first camera module 210 may be covered by the display area 131 of the screen 130.

Further, referring to FIGS. 1 to 3, a coordinate system may be established with an x-axis along a length direction of the terminal device 100, a y-axis along a width direction of the terminal device 100, and a z-axis along a thickness direction of the terminal device 100. The length direction is a direction from the bottom-side face 118 to the top-side face 116. The width direction is a direction from the left-side face 112 to the right-side face 114. The thickness direction is a direction from the front face 111 to the rear face 113. Referring to FIGS. 4 and 5, an orthographic projection of a wall of the arc-shaped groove 220 on a reference plane may present as a circular arc shape. The reference plane may be a geometric plane perpendicular to the thickness direction (the z-axis direction) of the terminal device 100. A rotation axis of the mounting base 200 may be tangent to an outer face of the mounting base 200. The rotation axis of the mounting base 200 may pass through a center of the orthographic projection of the wall of the arc-shaped groove 220.

In the above-mentioned mobile terminal 10, the first light incident face 211 of the first camera module 210 may be hidden in the terminal device 100 when the mounting base 200 is in the first position, and exposed from the front face 111 when the mounting base 200 is in the second position. The first camera module 210 could perform a function of a front camera when the mounting base 200 is at the second position. The above-mentioned structure may prevent the front camera from occupying an area of the screen 130, thereby improving the screen ratio of the mobile terminal 10. For example, the screen ratio of the mobile terminal 10 with the above-mentioned structure could be 85% or more. Since the arc-shaped groove 220 is defined in a region surrounded by the side-end face of the mounting base 200, the center of an arc of the arc-shaped groove 220 may be located on the side-end face of the mounting base 200. The mounting base 200 may slid relative to the restriction post 140 through the arc-shaped groove 220, so as to rotate to the first position and the second position. When the restriction post 140 slides relative to the mounting base 200 within the arc-shaped groove 220, the mounting base 200 may rotate with a rotation center coincide with the center of the arc-shaped groove 220. Therefore, an additional space used for avoiding interference between the first camera module 210 and the other mechanisms may not be needed. As a result, a gap between the mounting base 200 and the housing may be made very small, which could improve the appearance integrity of the mobile terminal 10. Since the restriction post 140 is inserted into the arc-shaped groove 220, the restriction post 140 utilizes the thickness of the mounting base 200, which is facilitate to the thinness of the mobile terminal 10 thin.

Referring to FIGS. 5 and 6, in some embodiments, the mounting base 200 may have a substantially rectangular block shape. An intersection line of the top-end face 236 and the right-end face 234 may form a first side edge 235. An intersection line of the top-end face 236 and the left-end face 232 may form a second side edge 237. The first side edge 235 and the second side edge 237 are exposed from the top side face 116. The first side edge 235 may pass through the center of the orthographic projection of the wall of the arc-shaped groove 220 on the reference plane. In the above-mentioned arrangement, the mounting base 200 could rotate between the first position and the second position with the first side edge 235 as a rotation axis. A gap located between, an edge that the wall of the mounting groove 120 corresponding to a position of the first side edge 235, and the first side edge 235, could be very small, which could improve the appearance integrity of the mobile terminal 10.

It may be understood that, the rotation center of the mounting base 200 is at an end of a diagonal line of the mounting base 200. The wall of the mounting groove 120 facing the left-end face 232 of the mounting base 200 may be processed into a circular arc surface, so that the other end of the diagonal line of the mounting base 200 opposite to the rotation center of the mounting base 200 could be smoothly swung out from the mounting groove 120. A gap located between, an edge that the wall of the mounting groove 120 corresponding to a position of the second side edge 237 could also be very small, which could improve the appearance integrity of the mobile terminal 10. Furthermore, an orthographic projection of the left-end face 232 on the reference plane has an arc shape, i.e., the left-end face 232 is processed into a curved face, and the rotation axis of the mounting base 200 passes through a center of the arc shape of the orthographic projection of the left-end face 232 on the reference plane. In the above-mentioned arrangement, the gap between the mounting base 200 and the terminal device 100 may be very small, so that probability of foreign matter such as dust or water droplets entering the terminal device 100 could be reduced. It is advantageous for waterproof and dustproof of the terminal device 100.

Furthermore, referring to FIGS. 5 and 6, a wall of the arc-shaped groove 220 may include a first limiting portion 221 and a second limiting portion 223. When the mounting base 200 is in the first position, the restriction post 140 may abut against the first limiting position 221, that is, the mounting base 200 could be stopped by the first limiting portion 223. When the mounting base 200 is in the second position, the restriction post 140 may abut against the second limiting position 223, that is, the mounting base is stopped by the second limiting position 223. The first limiting portion 221 and the second limiting portion 223 could limit a rotation range of the mounting base 200, so as to protect a circuit connection structure in the mounting base 200.

Figure 7:
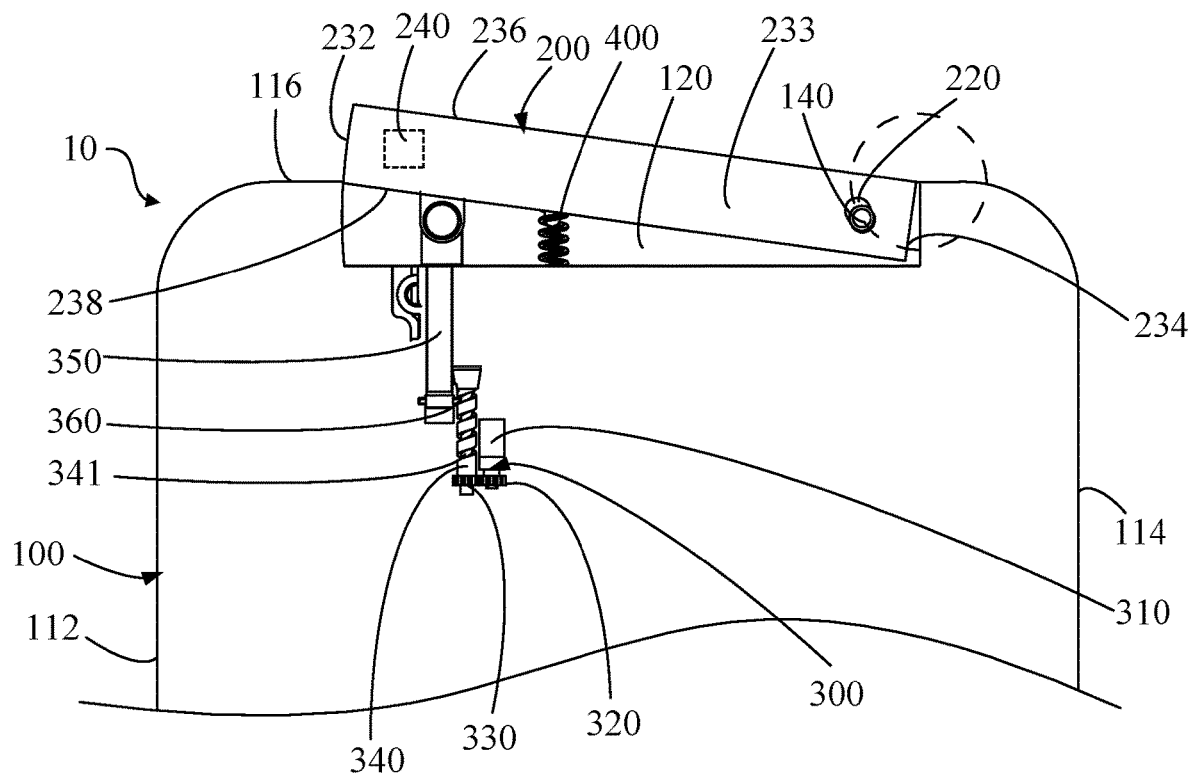
FIG. 7 is a schematic view of the mounting base shown in FIG. 4 in a second position in accordance with another embodiment in the present disclosure.
Figure 8:
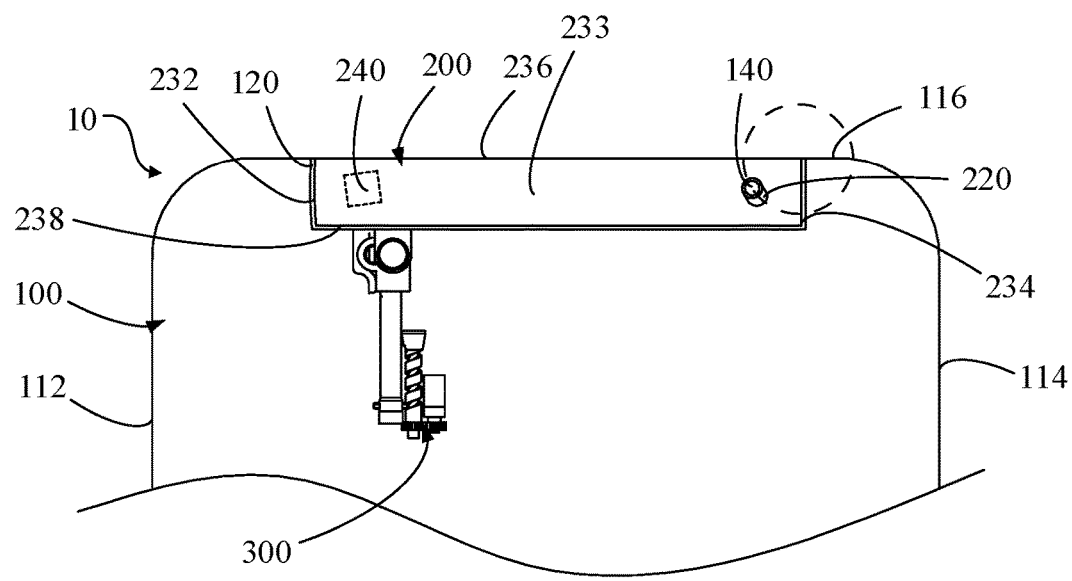
FIG. 8 is a schematic view of the mounting base shown in FIG. 7 in a first position.

Furthermore, referring to FIGS. 7 and 8, the first camera module 210 may include an image sensor 240. The image sensor 240 may be a charge coupled device (CCD) or a complementary metal oxide semiconductor (CMOS). An orthogonal projection of the image sensor 240 on the reference plane has a shape of rectangle. For example, the orthographic projection of the image sensor 240 on the reference plane may be square or rectangular. Referring to FIG. 7, when the mounting base 200 is in the second position, an orthographic projection of the image sensor 240 on the reference plane has a side closer to the top-side face 116, and the side is parallel to the width direction (the y-axis direction) of the terminal device 100. Referring to FIG. 8, when the mounting base 200 is in the first position, the side of the orthographic projection of the image sensor 240 on the reference plane inclines relative to the width direction (the y-axis direction) of the terminal device 100. Comparing the above-mentioned arrangement to a solution that the front camera is directly fixed on the terminal device 100, attitude of the image sensor 240 of the first camera module 210 is not changed when the mounting base 200 is in the second position. There is no need to greatly adjust imaging algorithm of the first camera module 210, so that the development cost of the mobile terminal 10 may be saved.

Referring to FIG. 7, the mobile terminal 10 may include a driving mechanism 300. The driving mechanism 300 may include a power member 310 and a push rod 350. The power member 310 may be connected to the terminal device 100. An end of the push rod 350 may be connected to the power member 310, the other end of the push rod 350 may be slidably connected to the mounting base 200. The power member 310 may be configured to drive the push rod 350 to move along the length direction (the x-axis direction) of the terminal device 100, to drive the mounting base 200 to rotate from the first position to the second position. Furthermore, in some embodiments, the power member 310 may be a motor. The driving mechanism 300 may include a first gear 320, a second gear 330, a lead screw 340, and a scroll member 360. The first gear 320 may be connected to the power member 310. The second gear 330 may be engaged with the first gear 320. The lead screw 340 may be connected to the second gear 330. A spiral groove 341 may be defined in the lead screw 340. The scroll member 360 may be rotatably connected to the push rod 350 and rollably disposed in the spiral groove 341. The push rod 350 may be slidably connected to the mounting base 200. The power member 310 may be configured to drive the first gear 320 to rotate. The first gear 320 may drive the lead screw 340 to rotate through the second gear 330. The lead screw 340 may drive the push rod 350 to move along the length direction of the terminal device 100, so as to drive the mounting base 200 to rotate from the first position to the second position. The arrangement of the drive mechanism 300 could facilitate the motorization of the movement of the mounting base 200, to improve the convenience of a user. For example, a physical button may be arranged on the terminal device 100. The power-on and power-off of the power member 310 may be controlled by the physical button. As a result, the motorization of the movement of the mounting base 200 could be realized. In other embodiments, a virtual button may be arranged on the terminal device 100. The power-on and power-off of the power member 310 may be controlled by the virtual button. As a result, the motorization of the movement of the mounting base 200 could also be realized.

In some embodiments, when the mounting base 200 is pushed from the first position to the second position, the mounting base 200 may be pushed back to the first position manually. In other embodiments, the mobile terminal 10 may include an elastic return member 400. An end of the elastic return member 400 may be connected to the mounting base 200. The other end of the elastic return member 400 may be connected to the terminal device 100. The elastic return member 400 may be configured to drive the mounting base 200 to rotate from the second position to the first position. The elastic return member 400 may be a spring, an elastic column, or the like, which is not recite herein.

Referring to FIG. 2 again, the mobile terminal 10 may further include a second camera module 500. The second camera module 500 may include a second light incident face 510. Ambient light may pass through the second light incident surface 510 and be incident on a photosensitive element of the second camera module 500. The second camera module 500 may be connected to the terminal device 100. The second light incident surface 510 may be exposed from the rear face 113. The second camera module 500 may perform a function of a rear camera. For example, a user may perform long-range shooting, video recording, and the like through the second camera module 500.

Referring to FIG. 3, the mounting base 200 may include a receiver 250 and a flash lamp 260. The flash lamp 260 may be an LED light. The flash lamp 260 and the receiver 250 may fill light when a user takes a self-photograph to obtain a better photographing effect. The flash lamp 260 and the receiver 250 may be hidden in the terminal device 100 when the mounting base 200 is in the first position. The flash lamp 260 and the receiver 250 may be exposed from the front face 111 when the mounting base 200 is in the second positions. In the above-mentioned arrangement, the receiver 250 and the flash lamp 260 do not need to occupy the area of the screen 130, thereby improving the screen ratio of the mobile terminal 10, no additional description is given herein.

The technical features of the above-mentioned embodiments may be arbitrarily combined. For the sake of brevity of description, all possible combinations of the technical features in the above-mentioned embodiments are not described. However, as long as there is no contradiction between the combinations of these technical features, all should be considered as the scope of this manual.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A mobile terminal, comprising:
a terminal device, comprising:
a housing, comprising a front face, a rear face arranged opposite to the front face, and a side-circumferential face connected between the front face and the rear face; wherein the side-circumferential face comprises a left-side face, a right-side face arranged opposite to the left-side face, a top-side face and a bottom-side face arranged opposite to the top side face; the left-side face and the right-side face are arranged between the top-side face and the bottom-side face; and the top-side face and the bottom-side face are arranged between the left-side face and the right-side face;
a screen, embedded in the housing and defining a mounting groove with the housing; wherein the mounting groove penetrates the top-side face, and the screen comprises a display area facing a same direction as the front face; and
a restriction post, arranged on an inner wall of the mounting groove; and a mounting base, received in the mounting groove and comprising:
a shell, comprising a front-end face, a rear-end face arranged opposite to the front-end face, and a side-end face connected between the front-end face and the rear-end face; wherein the side-end face comprises a left-end face, a right-end face arranged opposite to the left-end face, a top-end face, a bottom-end face arranged opposite to the top-end face; the left-end face and the right end face are arranged between the top-end face and the bottom-end face; the top-end face and the bottom-end face are arranged between the left-end face and the right end face; the front-end face is arranged towards the front face; and an arc-shaped groove penetrating at least one of the front-end face and the rear-end face is defined in the shell, the arc-shaped groove is defined between the top-end face and the bottom-end face, and between the left-end face and the right-end face; and
a first camera module, arranged on the shell and comprising a first light incident face being exposed from the front-end face;
wherein the restriction post is inserted into the arc-shaped groove; and the mounting base is configured to rotate through a sliding fit between the arc-shaped groove and the restriction post, to a first position at which the first camera module is in the mounting groove and the first light incident face is hidden in the terminal device, and a second position at which the first camera module is out of the mounting groove and the first light incident face is exposed from the front face.

2. The mobile terminal according to claim 1, further comprises a power member connected to the terminal device and a push rod, wherein an end of the push rod is connected to the power member, the other end of the push rod is slidably connected to the mounting base; and the power member is configured to drive the push rod to move along a direction from the bottom-side face to the top-side face, to drive the mounting base to rotate from the first position to the second position.

3. The mobile terminal according to claim 2, further comprising:
a first gear, connected to the power member;
a second gear, engaged with the first gear;
a lead screw, connected to the second gear and defining a spiral groove; and
a scroll member, rotatably connected to the push rod and rollably disposed in the spiral groove;
wherein the power member is configured to drive the first gear to rotate, the first gear is configured to drive the lead screw to rotate through the second gear, and the lead screw is configured to drive the push rod to move along the direction from the bottom-side face to the top-side face.

4. The mobile terminal according to claim 1, wherein the top-end face is flush with the top-side face when the mounting base is at the first position; and
the top-end face is offset from the top-side face when the mounting base is at the second position.

5. The mobile terminal according to claim 1, wherein an orthogonal projection of the left-end face on a reference plane has an arc shape, and a rotation axis of the mounting base passes through a center of the arc shape of the orthogonal projection of the left-end face; and
the reference plane is a geometric plane perpendicular to a direction from the front face to the rear face.

6. The mobile terminal according to claim 1, wherein an intersection line of the top-end face and the right-end face forms a first side edge; an intersection line of the top-end face and the left-end face forms a second side edge; the first side edge and the second side edge are exposed from the top-side face; the first side edge passes through a center of an orthographic projection of a wall of the arc-shaped groove on a reference plane; and
the reference plane is a geometric plane perpendicular to a direction from the front face to the rear face of the terminal device.

7. The mobile terminal according to claim 1, wherein a wall of the arc-shaped groove comprises a first limiting portion and a second limiting portion;
when the mounting base is at the first position, the restriction post abuts against the first limiting portion; and when the mounting base is at the second position, the restriction post abuts against the second limiting portion.

8. The mobile terminal according to claim 1, wherein the first camera module comprises an image sensor, an orthogonal projection of the image sensor on a reference plane has a shape of rectangle;
when the mounting base is at the second position, an orthographic projection of the image sensor on the reference plane has a side closer to the top-side face, and the side is parallel to a direction from the left-side face to the right-side face; and
the reference plane is a geometric plane perpendicular to a direction from the front face to the rear face of the terminal device.

9. The mobile terminal according to claim 1, further comprises a second camera module having a second light incident face;
the second camera module is arranged on the terminal device, the second light incident surface is exposed from the rear face.

10. The mobile terminal according to claim 1, wherein the mounting base comprises a receiver and a flash lamp;
when the mounting base is at the first position, the flash lamp and the receiver are hidden in the terminal device; and
when the mounting base is at the second position, the flash lamp and the receiver are exposed from the front face.

11. The mobile terminal according to claim 1, further comprises an elastic return member, wherein an end of the elastic return member is connected to the mounting base, the other end of the elastic return member is connected to the terminal device; and the elastic return members is configured to drive the mounting base to rotate from the second position to the first position.

12. The mobile terminal according to claim 1, wherein the mounting groove is defined between the left-side face and the right-side face, and between the front face and the rear face.

13. The mobile terminal according to claim 1, wherein when the mounting base is at the first position, at least part of the first camera module is covered by the display area of the screen.

14. An electronic apparatus, comprising:
a main body, defining a chamber;
a rotating member, received in the chamber and rotatably connected to the main body; and
a sliding mechanism, comprising a sliding rail and a sliding member matching with the sliding rail; wherein the sliding rail is arranged on one of the main body and the rotating member, and the sliding member is arranged on the other one of the main body and the rotating member;
wherein the sliding member is capable of sliding in the sliding rail, such that the rotating member rotates out and into the chamber, and
wherein the sliding rail is a sliding groove having an arc shape, a rotation axis of the rotating member is tangent to an outer surface of the rotating member, and the rotation axis passes through a center of an arc of the sliding groove.

15. The electronic apparatus according to claim 14, wherein the sliding rail is defined in the rotating member, and the sliding member is a restriction post arranged on an inner wall of the chamber and inserted to the sliding groove.

16. The electronic apparatus according to claim 15, wherein the rotating member comprises:
a supporter, rotatably connected to the inner wall of the main body; and
a camera assembly, fixed on the supporter;
wherein the sliding groove is defined in the supporter, when the rotating member is at a first position, a first camera assembly is hidden in the main body; and when the rotating member is at a second position, the first camera assembly is exposed out of the main body.

17. The electronic apparatus according to claim 15, wherein a wall of the sliding groove comprises a first limiting portion and a second limiting portion opposite to the first limiting portion;
when the rotating member is rotated to a first position, the rotating member is stopped by the first limiting portion; and
when the rotating member is rotated to a second position, the rotating member is stopped the second limiting portion.

18. The electronic apparatus according to claim 14, further comprises a power member connected to a terminal device and a push rod, wherein an end of the push rod is connected to the power member, the other end of the push rod is slidably connected to the rotating member; the power member is configured to drive the push rod to move to drive the rotating member to rotate.

19. An electronic apparatus, comprising:
a main body, comprising:
a housing;
a screen, embedded in the housing and defining a mounting groove with the housing; and
a restriction post, arranged on the housing; and
a mounting base, received in the mounting groove and defining an arc-shaped groove;
wherein the restriction post is inserted into the arc-shaped groove; and the mounting base is configured to rotate, through a sliding fit between the arc-shaped groove and the restriction post, to a first position at which the mounting base is in the mounting groove and a second position at which the mounting base is out of the mounting groove; and
wherein a rotation axis of the mounting base is tangent to an outer surface of the mounting base, and the rotation axis passes through a center of an arc of the arc-shaped groove.

* * * * *